United States Patent [19]

Schoenig et al.

[11] Patent Number: 5,108,692
[45] Date of Patent: Apr. 28, 1992

[54] NON-DESTRUCTIVE TESTING OF NUCLEAR FUEL RODS

[75] Inventors: Fred C. Schoenig, Wilmington, N.C.; Bruce J. Kaiser, Kennewick, Wash.; Carl P. Ruiz, Fremont, Calif.; Frank S. Moore, Jr., Wilmington, N.C.

[73] Assignee: General Electric Company, San Jose, Calif.

[21] Appl. No.: 410,784

[22] Filed: Sep. 22, 1989

Related U.S. Application Data

[62] Division of Ser. No. 238,659, Aug. 31, 1988.

[51] Int. Cl.⁵ .............................................. G21C 17/00
[52] U.S. Cl. .................................................... 376/159
[58] Field of Search .............. 376/159, 257, 245, 261; 250/390, 391, 392, 492.1

[56] References Cited

U.S. PATENT DOCUMENTS

| | | |
|---|---|---|
| 3,728,544 | 4/1973 | Untermyer. |
| 3,755,675 | 8/1973 | Stepan et al. |
| 3,786,256 | 1/1974 | Untermyer .......................... 376/159 |
| 4,134,064 | 1/1979 | Jacobs et al. |
| 4,229,654 | 10/1980 | Arya et al. |
| 4,243,939 | 1/1981 | Grossman et al. |
| 4,347,622 | 8/1982 | Bernatowicz et al. ............. 376/257 |
| 4,564,498 | 1/1986 | Grossman et al. |
| 4,647,420 | 3/1987 | Bramblett et al. .................. 376/159 |
| 4,663,112 | 5/1987 | Gradel et al. ....................... 376/257 |
| 4,822,552 | 4/1989 | Ahmed et al. ...................... 376/257 |

Primary Examiner—Harvey E. Behrend
Attorney, Agent, or Firm—R. R. Schroeder; H. C. Burgess

[57] ABSTRACT

Both gadolinia nuclear fuel rods and urania fuel rods are non-destructively tested to determine the enrichment concentration of the fuel pellets therein by serially conveying the gadolinia rods and the urania rod along separate test channels through an active scanner where they are irradiated from a common neutron souce, and the neutron-induced gamma ray emissions are counted as a measure of the enrichment concentrations at a multiplicity of points distributed along the rod length. The enrichment counts are corrected for background radiation, variations in fuel density, and, in the case of gadolinia rods, for gadolinia content by passing these rods through a magnetometer.

8 Claims, 3 Drawing Sheets

NON-DESTRUCTIVE TESTING OF NUCLEAR FUEL RODS

This is a divisional of co-pending application SER. No. 07/238,659 filed on Aug. 31, 1988 pending.

BACKGROUND OF THE INVENTION

The present invention relates to non-destructively testing nuclear fuel rods and particularly to determining that nuclear fuel rods have been manufactured in strict accordance with engineering specifications.

A nuclear fuel rod is comprised of a column of fuel pellets sealed in an elongated cladding tube formed of a zirconium alloy. The several hundred fuel pellets are typically in the form of sintered ceramic tablets approximately one centimeter in both diameter and length. A typical nuclear fuel for use in water cooled and moderate power reactors comprises uranium dioxide ($UO_2$) in which from about 0.7 to 5.0 percent by weight is fissile U-235 mixed with fertile U-238. The pellet column is maintained compacted by a spring acting in a tube plenum chamber which also contains a suitable getter. The fuel rods are arranged in groups and supported as separately replaceable fuel assemblies in the reactor core. A typical fuel assembly is shown in U.S. Pat. NO. 3,689,358.

To decrease local power peaking and to improve power distribution throughout the fuel assembly, it is common practice to vary the U-235 pellet enrichment concentration along the length of the rod. This is typically done with respect to groups or zones of pellets of various lengths, and a fuel rod may have as many as seven such pellets zones of varying enrichment concentrations within the range of 0.7 to 5 percent. It is also common practice to include in a fuel assembly a number of fuel rods containing a strong neutron absorbing material or "burnable poison", such as gadolinium. By appropriately locating predetermined concentrations of this burnable poison within a fuel assembly, enhanced control of the nuclear reaction is afforded, and thus less reactor control by the mechanical positionings of neutron absorbing control rods is required. Reactor shutdown safety margin is also improved. Moreover, the power distribution profile of a fuel assembly can be more efficiently optimized and maintained over a longer operating life. Typically, a neutron absorbing poison, such as gadolinium oxide (gadolinia) is mixed in with uranium oxide (urania) in concentrations up to 5 percent by weight prior to sintering into pellet form. As with enrichment, gadolinia concentration varies from pellet zone to pellet zone within a fuel rod.

A fuel assembly is thus made up of a number of pure urania fuel rods of designed varying enrichment concentrations from rod to rod and from zone to zone within each rod and a lesser number of poisoned or urania-gadolinia rods also of varying enrichment and gadolinia concentrations from rod to rod and zone to zone. These concentrations and their pellet locations within the fuel assembly must conform to strict engineering specifications in order to assure reactor safety and regulatory compliance, as well as achieve the above-noted reactor performance improvements. It is thus critical that the fuel rods be manufactured strictly to these engineering specifications. Each and every pellet must be in its proper place within each fuel rod. Rigid quality assurance is thus imperative, requiring precise non-destruction testing of each and every fabricated fuel rod. This testing must include, among other properties, accurate determinations of enrichment and poison concentrations at a multiplicity of points along the length of the rod, fuel density, uranium weight in each zone, zone length, out-of-specification pellets, and the presence of the spring and getter.

An early approach to non-destructively determining the enrichment concentration of a non-poisoned fuel rod involved a "passive scanning" method, wherein gamma rays of characteristic energy emitted during the natural radioactive decay of fissile material such as U-235 was quantitatively detected. Since U-235 has a relatively long half-life, its spontaneous disintegration rate and the consequent gamma ray emission rate is low. Consequently, the scanning time required for accurate enrichment quantitative analysis was extremely long, even when the rods were scanned by a distributed array of gamma ray detectors and their counts accumulated. Since every fuel rod must be tested, manufacturing throughput is severely reduced by this passive scanning approach.

To dramatically reduce the testing times for non-poisoned fuel rods, an "active scanning" approach has been adopted. This mentod involves moving a fuel rod past a source of neutrons of selected energy, and then past a detector quantatively responsive to the gamma radiation resulting from the neutron-induced fission of U-235. Knowing the radiation count at each location along the length of the fuel rod, the enrichment concentration thereat can be readily calculated.

Non-destructive testing of poisoned fuel rods presents a considerably more formidable task and thus have been analyzed separately from non-poisoned fuel rods by different quality assurance systems. The presence of a poison, such as gadolinia, has heretofore been deemed to render active scanning ineffective, since the poison acts as a strong neutron absorber and thus absorbs the major portion of the activation neutrons which would otherwise induce fission of the U-235 fissile material. Thus, active scanning systems have heretofore not been able to distinguish whether a detected gamma ray count originated from a fuel rod containing high concentrations of both enrichment and poison or one containing low concentrations of both enrichment and poison. This confusion is further complicated by the fact that enrichment and poison concentrations typically vary from zone to zone along the length of the fuel rods.

Consequently, commercial non-destructive testing of poisoned fuel rods has been limited to quality assurance systems using the passive scanning approach, such as described and claimed in commonly assigned Arya et al. U.S. Pat. No. 4,229,654, the disclosure of which is specifically incorporated herein by reference. As disclosed therein, a fuel rod containing gadolinia-poisoned urania pellets is scanned by passing it through a magnetometer acting to determine from detected changes in paramagnetic susceptibility upon movement in a strong magnetic field the concentrations and distribution of the poison, typically gadolinia. The fuel rod passes a ultrasonic sensor providing tube wall thickness data and a densitometer providing fuel density data, on corresponding data point by data point basis. The fuel rod then passes a distributed array of up to eight detectors responsive to the gamma rays emitted from the fissile, U-235 content of the fuel due to natural radioactive decay. The gamma ray counts of the plural detectors are combined for hundreds of distinct data points distributed along the rod length. The accumulated counts of all the detectors are analyzed and corrected for poison concentration, density, tube wall thickness, and other factors to determine the enrichment concentration at each data point location along the fuel rod length. While this passive scanning system is extremely accurate, it is also slow, requiring a scanning time of approximately ten minutes per gadolinia rod as compared to a scanning time of less than three minutes per rod using an active scanning system. Since the current trend is to use more and more gadolinia fuel rods in fuel assemblies, the slow passive scanning time to non-destructively test them is increasingly becoming a severe production bottleneck. In addition, it is extremely expensive to design, build, operate and maintain one system to test gadolinia-bearing fuel rods and another separate system to test pure urania non-poisoned fuel rods.

It is accordingly an object of the present invention to provide a single quality assurance inspection system and method applicable to non-destructively testing both poisoned and non-poisoned nuclear fuel rods.

A further object is to provide a quality assurance inspection system and method of the above-character, wherein the time required to non-destructively test a poisoned nuclear fuel rod is materially reduced.

An additional object is to provide a quality assurance inspection system and method of the above-character, wherein the time required to non-destructively test a poisoned nuclear fuel rod is reduced to substantially equal the time required to non-destructively test a non-poisoned nuclear fuel rod.

Another object of the present invention is to provide a quality assurance inspection system and method of the above-character, wherein both poisoned and non-poisoned nuclear rods are non-destructively tested using the same scanning approach.

A still further object is to provide a quality assurance inspection system and method of the above-character wherein both poisoned and non-poisoned nuclear rods are actively scanned pursuant to determining the U-235 enrichment concentrations along the lengths of their fuel columns.

An additional object is to provide a quality assurance inspection system and method of the above-character wherein both poisoned and non-poisoned nuclear fuel rods are actively scanned pursuant to determining the grams of uranium and grams of U-235 in each of the fuel zones of the fuel columns.

Yet another object is to provide a quality assurance inspection system and method of the above-character which is implemented by a single non-destuctive testing system concurrently accepting both poisoned and non-poisoned nuclear fuel rods for separate analysis.

Other objects of the invention will in part be obvious and in part appear hereinafter.

SUMMARY OF THE INVENTION

In accordance with the present invention, there is provided an inspection system and method for concurrently perfoming quality assurance analyses of poisoned and non-poisoned nuclear fuel rods using the same nondestuctive testing apparatus. Accordingly, poisoned nuclear fuel rods, loaded with sintered fuel pellets of uranium oxide and additive amounts of a neutron absorbing material such as gadolinia, and non-poisoned nuclear fuel rods, containing basically urania, are sorted into separate input queues. This sorting is done on the basis of serial numbers borne by each rod which uniquely indentifies each rod and the particular engineering specifications to which each rod should have been manufactured. These serial numbers, indicating whether each rod is poisoned or not, are read into a computer programmed to control the performance of the inspection method and to analyze the various test data results against the appropriate engineering specifications held in storage.

From their input queues, poisoned fuel rods are fed in succession through a magnetometer operating to generate test data indicative of the gadolinia concentration at each of a multiplicity of data points uniformly distributed along the length of the pellet column within each fuel rod. These test data are stored by the computer for each data point. From the magnetometer, the gadolinia rods are fed in succession through a gamma ray densitometer and past a background detector responsive to the gamma ray emission resulting from the natural decay of the uranium and the associated daughter product isotopes in the fuel pellets. Density data and background radiation data are accumulated in the computer on the same data point by data point basis. The gadolinia fuel rods are then successively fed through an irradiator cask along a path offset from the center of the cask where a neutron source is located. The gadolinia rods are irradiated from a source of neutrons, and the quantity of gamma ray emission resulting from the neutron-induced fission of the U-235 is detected by one and preferably two or more gamma ray detectors stationed downstream from the neutron beam, all in accordance with active scanning principles. The gamma ray counts are accumulated in the computer on a data point by data point basis. The computer then has all of the test data necessary to determine the data point by data point concentrations of U-235 enrichment and poison, fuel density and weight, and numerous other non-destructively detected fuel rod properties. These test results are then analyzed by the computer against the stored engineering specifications applicable to each fuel rod pursuant to rendering accept-reject decisions which are used to control a sorter stationed beyond the output of the cask.

Pure urania fuel rods are independently fed in succession from their separate input queue directly through the densitometer and past a separate background radiation detector, bypassing the gadolinia concentration-determining magnetometer. The urania rods are then successively fed through the irradiator cask, irradiated by the neutron flux from the same centrally located neutron source, and the neutron-induced fission product gamma rays are counted by a separate set of detectors in the same active scanning manner as in the case of the gadolinia fuel rods. The density, background and gamma ray emission data for the urania rods are accumulated and analyzed against the stored engineering specifications applicable to each urania fuel rod by the computer on a data point by data point basis, whereupon the computer issuse appropriate reject-accept instructions to an output sorter.

This quality assurance inspection system is utilized, depending on the specific quantities of pure urania and gadolinia fuel rods necessary for production, to inspect only gadolinia rods, only urania rods, or both types together.

The invention accordingly comprises the features of construction, combination of elements and arrangement of parts, and the method of operating same, all as will be exemplified in the description hereinafter set forth, and the scope to the invention will be indicated in the claims.

For a fuller understanding of the nature and objects of the invention, reference may be had to the following detailed description taken in conjunction with the accompanying drawings, in which:

DETAILED DESCRIPTION

Figure 1:
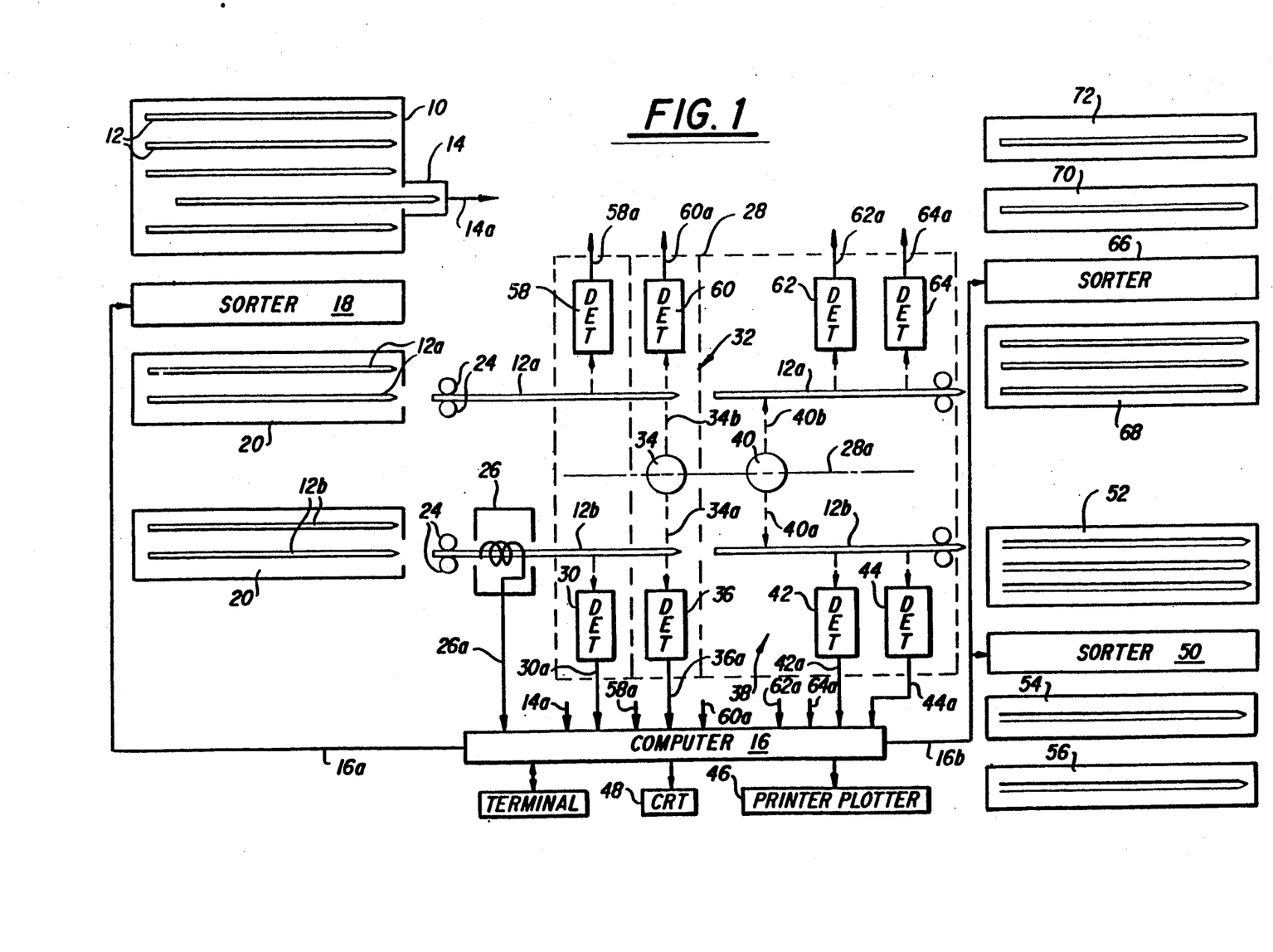
FIG. 1 is a schematic diagram of a system for performing non-destructive inspections of gadolinia and pure urania nuclear fuel rods constructed in accordance with the present invention.

An exemplary non-destructive testing system for performing the method of the present invention is illustrated in FIG. 1 as including an input queue 10 on which a plurality of nuclear fuel rods 12 are loaded. Each rod is comprised of a column of fuel pellets sealed in a zirconium alloy cladding tube which may be 1.27 centimeters in outside diameter and 4.2 meters long. Each fuel pellet is one centimeter in both diameter and length and comprises uranium dioxide or urania ($UO_2$) compressed and sintered into a ceramic pellet shape. The urania consists of fertile U-235 and currently from about 0.7 to 5.0 percent by weight fissile U-235. However, in some of the nuclear fuel rods, the pellets also include additive amounts of a strong neutron absorbing material or burnable poison, such as gadolinia, in varying concentrations currently up to 5.0 percent by weight. The pellet column is maintained compacted by a spring (not shown) acting in a tube plenum section which also contains a suitable getter. In the case of pure urania or non-poisoned fuel rods, the pellets are arranged along the tubes length in groups or zones of specified varying lengths, with each zone typically comprised of pellets containing uniform concentrations of U-235 enrichment. The enrichment varies from zone to zone in accordance with engineering specifications. In the case of poisoned or gadolinia-bearing fuel rods, the pellets are also arranged in zones of uniform enrichment and gadolinia content, with either or both varying from zone to zone, all according to specification.

Since the system must handle gadolinia-containing fuel rods and pure urania fuel rods separately, the rods 12 are advanced on input queue 10 to a optical reader 14 where a unique serial number engraved on the head end plug of each rod is read in succession. This serial number identifies the particular fuel rod and also the engineering specifications to which it should have been fabricated. The serial numbers are read out via leads 14a to a computer 16. Since these serial numbers distinguish gadolinia rods from urania rods, the computer can control a sorter 18 to successively transfer the latter 12a to an input queue 20 and the former 12b to input queue 22. Alternatively, gadolinia rods and urania rods, which typically are fabricated at different locations, are loaded into their respective queues. However, the serial number of each rod must be entered into computer 16 in a manner such that it can be identified and tracked through its inspection procedure so that its test results can be analyzed with respect to the applicable engineering specifications stored in the computer in the form of "rod maps".

Still referring to FIG. 1, gadolinia rods 12b are successively unloaded from their input queue 22 and fed by pinch rollers 24 at a closely regulated, uniform speed through a magnetometer 26 which is preferably of the construction disclosed in commonly assigned Grossman et al. U.S. Pat. No. 4,243,939, the disclosure of which is specifically incorporated herein by reference. Thus, this magnetometer includes a pair of superconductive electromagnets persistently energized to develop constant magnetic fields of different high field strengths (sufficient to saturate any iron impurities in the fuel pellets) through which each gadolinia rod 12b is passed in succession. The differential paramagnetic susceptibility of the material of each pellet is detected during rod movement through these two magnetic fields and is read out to computer 16 over lead 26a. The susceptibility signals, respectively corresponding to a multiplicity of data points uniformly distributed along the length of the pellet column in each rod 12b, e.g., every 0.125 inches, are compared to known standards stored in the computer to determine and retain the gadolinia concentration data at each data point.

While pinch rollers 24 have been illustrated for the sake of drawing clarity to convey the rods, it will be appreciated that other types of conveyors, such as belt conveyors, may be more suitable for this purpose.

After the magnetometer analysis, each gadolinia fuel rod 12b is fed into an irradiator cask 28 where it moves in a channel extending through a background detector 30. This detector, which may be an NaI or BGO hole-through detector, measures the gamma ray emission resulting from the natural decay of the uranium and its associated daughter isotopes in the fuel pellets. This background data is supplied to the computer over leads 30a and stored on a data point by data point basis. Next, each gadolinia rod 12b is fed through a multi-detector gamma densitometer, generally indicated at 32. This densitometer includes a suitable source 34, such as a Cs-137 source, which is centrally located on the centerline 28a of irradiator cask 28. A highly collimated gamma ray beam 34a emitted by this source is aimed at the axis of each fuel rod 12b moving in its channel through the cask. A suitable detector 36, such as a plastic scintillation detector, is situated in alignment with this beam beyond rod 12b and measures the degree of attenuation of the gamma rays, which is indicative of fuel pellet density. This density count data is supplied to computer 16 where it is stored on a data point by data point basis.

The gadolinia rods proceed serially from densitometer 32 through an enrichment-measuring active scanning section, generally indicated at 38, contained within irradiator cask 28. This active scanning section includes a source 40 of neutrons, such as a standard CF-252 neutron source of a suitable strength, such as 2.2 mg. This source is also located on the cask centerline 28a. Each rod 126 is exposed to neutron flux, as indicated at 40a, emanating from source 40, thereby causing a limited number of the fissile U-235 atoms in the fuel pellets to undergo fission. The neutron flux is designed to produce a U-235 to U-238 fission ratio on the order of at least 10,000 to 1 for non-gadolinia fuel. Beyond the neutron source, the rods 12b pass through at least two hole-through detectors 42 and 44, such as bismuth germanate (BGO) detectors. These detectors jointly measure the intensity of the resulting gamma rays emitted from each gadolinia fuel rod as it passes through. The gamma ray counts accumulated for each data point along the pellet column of each rod, accurately indicative of U-235 enrichment concentration thereat, are separately supplied by associated detector circuitry (not shown) over leads 42a and 44a to the computer for storage on a data point by data point basis.

The computer now has all the test data necessary to assay the enrichment and gadolinia contents at each data point and to determine a number of other fuel rod properties, all as described below. The results are then compared against the engineering specifications or rod map called for by the serial number of each rod, from which the computer determines whether each rod falls within predetermined limits and is acceptable or not and is rejectable. The hard copy of the test results are printed out by a plotter-printer 46. If desired, test results may be displaced on a CRT 48. On the basis of the accept-reject determination, the computer signals a sorter 50 over lead 16b to transfer fuel rods 12b from an output queue 52 to either a gadolinia rod accept tray 54 or a gadolinia rod reject tray 56.

Urania rods 12a are fed serially from input queue 20 by additional sets of pinch rollers 24 along a separate test channel extending through a separate NaI hole-through detector 58 which measures the background gamma ray emission along the rod length. This background count data is fed over leads 58a to computer 16 for storage on a data point by data point basis. Note that the urania rods do not contain gadolinia and thus need not pass through a gadolinia content-measuring magnetometer. The urania rods then pass successively through gamma densitometer 32, wherein the attenuation of another collimated gamma ray beam 34b aimed at the rod axis by the centrally located source 34 is measured by another detector 60. The resulting density count data is fed over leads 60a to the computer for storage again by data point location along the rod length.

Next, urania rods 12 progress through the active scanning section 38 within cask 28 where they are irradiated by neutron flux, indicated at 40b, from the centrally located source 40 and then pass through a second set of BGO hole-through detectors 62 and 64 stationed along the urania rod test channel. The gamma ray counts of these detectors are accumulated and transmitted on a data point by data point basis respectively over leads 62a and 64a to the computer. All of the data has thus been entered to enable assaying the point by point enrichment concentration of the pellet column in each rod 12a, as well as other properties for which each rod is tested. After comparison of the test results against the particular engineering specifications (rod map) called for by the serial number of each rod, the computer signals an accept-reject sorter 66 to transfer conforming rods from an output queue 68 to an urania rod accept tray 70 and non-conforming rods to an urania rod reject tray 72. Urania and gadolinia rods can be non-destructively inspected concurrently or separately, depending on production requirements.

Figure 2:
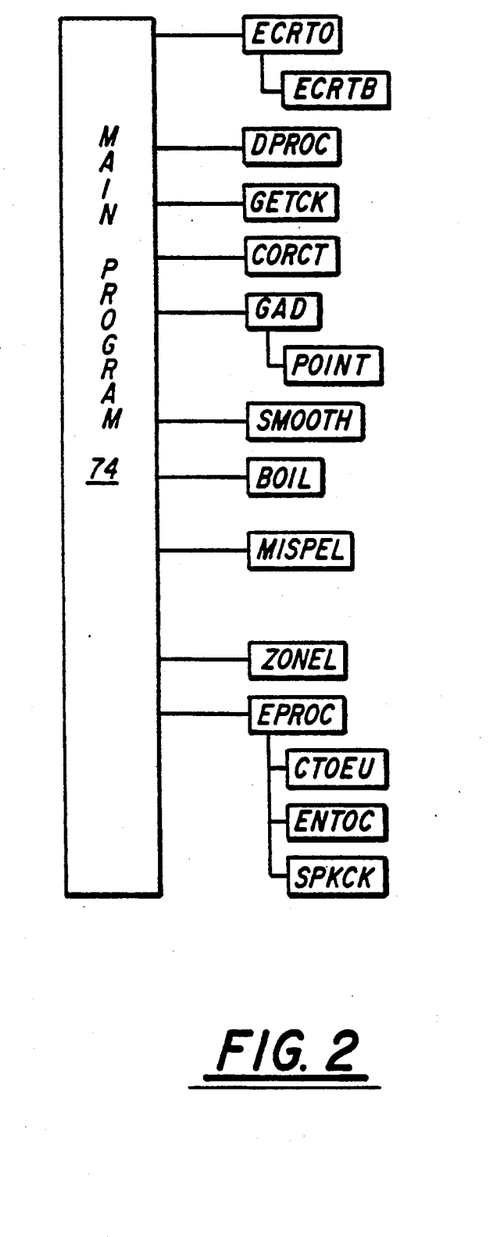
FIG. 2 is a diagram of a computer program for processing test data results obtained by the system of FIG. 1 in accordance with the method of the present invention.

The test results for each gadolinia rod 12b and each urania rod 12a are separately processed by a main computer program indicated by block 74 in FIG. 2, with, as will be noted, certain routines and subroutines thereof being altered or omitted depending on which of the two types of rods is involved. First considering urania fuel rods, once each rod 12a exits active scanning section 38 onto output queue 68, processing of test data results begins, while test data is being taken for the next urania rod following along at a suitable interval, e.g., six inches. Main program 74 first enters routine ECRTO, and the enrichment counts of detectors 62 and 64 are separately combined for each data point along the length of the fuel column. In subroutine ECRTB the combined enrichment counts are corrected for naturally occurring background radiation by subtracting the background count data of detector 58 from the combined detector 62, 64 enrichment counts for each data point. Since there is only one background detector, a correction factor is applied to its background count data to render it equivalent to the combined enrichment count data at each data point. The background-corrected enrichment count data are thus measures of the detected point-by-point gamma ray emission resulting from passage through active scanner 38. Since there is a well known mathematical relationship between gamma ray count (radioactivity) and U-235 enrichment concentration, and thus having measured the point by point gamma ray count and knowing both the rod scanning speed and the neutron source characteristics, enrichment concentration at each data point can be readily determined. However, there are other rod properties that must be examined.

Thus in the next program routine DPROC, the density data gathered by detector 58 in gamma densitometer 32 is analyzed to precisely identify the data points along the rod length corresponding to the beginning and end of the pellet column therein. The density data is also checked in routine DPROC for gaps between pellets and that the pellet density is within allowable limits. In the next routine GETCK, the density data is checked to make sure of the presence of the getter and the pellet column compacting spring, as well as its length. If there are a predetermined number of consecutive data points along the plenum chamber where the gamma ray intensity measured by detector 60 is between 70 and 80 percent of the open beam intensity, the getter is assumed present. The density data is also printed out as a trace of density versus location along the length of the rod by plotter-printer 46. In routine CORCT, using the density data, a data point by data point correction in the enrichment counts is made for variations in density from pellet to pellet.

The next routine for an urania rod is to smooth the enrichment data. This is necessary because the count rate for each data point along the rod is affected by gamma rays emanating from data points to either side. Thus, the enrichment data for each data point is assigned a weighting value of one, and the enrichment data for the three neighboring data points to each side are assigned predetermined lesser weighting values, down to 0.1 for the outer two. Each data point enrichment data is then factored with the weighted enrichment data of its neighboring six data points in routine SMOOTH. This running seven point weighted data averaging or smoothing step also improves the single pellet detection capability of the subsequent MISPEL routine and the zone change detection sensitivity of the subsequent ZONEL routine.

In the next routine BOIL, the smoothed enrichment data for every two data points are averaged together, thus halving the number of data points, e.g., from 1280 to 640 data points. This is done to simplify subsequent data processing and plotting of the enrichment trace by plotter 46. In addition, deviant pellet detection is improved. In routine MISPEL, the smoothed and boiled enrichment data is checked for misplaced pellets, that is, the existence of an enriched pellet in the natural pellet zones typically located at the ends of the pellet column. Next, in routine ZONEL, the enrichment data is checked for changes in enrichment content, connoting a transition from a pellet zone of one enrichment content to a pellet zone of a different enrichment content. The difference between the numbers of the data points at adjacent pairs of these noted enrichment changes divided by the number of data points per inch yields zone length in inches. Routine EPROC then calculates zone average enrichment, a property of primary design concern, by averaging the enrichment data over the date points within each zone as determined by routine ZONEL. Zone average enrichment, zone length, and the ratio of measured zone average density to design density are used to calculate the grams weight of U-235 and the grams weight of total uranium in each zone. The percent enrichment in the upper three feet of the pellet column is calculated to determine if the requirements for cold shut down margin are satisfied. Subroutine CTOEU converts the enrichment count data to enrichment in weight percent on a boiled data point by data point basis (routine BOIL) by solving the equation expressing their mathematical relationship using an iterative approximation procedure. The result is printed by the plotter 46 as trace of enrichment weight percent versus location along the rod length.

Subroutine ENTOC converts enrichment weight percent back to enrichment counts, and subroutine SPKCK checks the boiled data point enrichment counts for rejectable enrichment spikes and pellet strings. Rejectable spikes are local enrichment spikes, positive or negative, that are in excess of the zone average enrichment by a predetermined limit, e.g. ten percent. A rejectable pellet strings is any portion of a pellet zone in excess of six inches long whose average enrichment differs from the zone average enrichment by more than a preset limit, e.g. 0.1 weight percent absolute. The main program then checks the enrichment count data against the appropriate rod map retrieved from storage to determine if the tested urania rod has been fabricated in accordance with applicable engineering specifications, and, based on this determination and the others noted above, the accept-reject decision is automatically rendered.

In the case of a gadolinia rod 12b, the data point by data point enrichment counts of detectors 42 and 44 are combined in routine ECRTO and corrected for background in subroutine ECRTB using the background data count obtained from detector 30. Routines DPROC and GETCK, analyze the density data from detector 36 to find the start and end data points of the pellet column, check for pellet gaps, verify the presence of the getter and spring, and determine the spring length. Thus, to this point, the program is the same for either type of fuel rod.

For gadolinia rods however, the enrichment count data density correction routine CORCT that corrects for pellet-to-pellet density variations also corrects the point-by-point density data for gadolinia content. Since the presence of gadolinia produces a definite change in the degree of gamma ray attenuation that detector 36 would otherwise see, the gadolinia content data developed by magnetometer 26 is used to correct the density data for gadolinia content in routine CORCT. Printer-plotter 46 then prints out a density trace from the corrected density data.

Only in the case of a gadolinia rod 12b, the next routine is GAD. Here, the gadolinia data is corrected by subtracting therefrom the average of the magnetometer output signals occurring just before a rod enters and just after it leaves the magnetic field. This correction effectively establish a zero gadolinia content data reference for each rod 12b and also compensates for any thermal drift while the rod is passing through the magnetometer. The GAD routine also determines point by point weight percent gadolinia in the manner disclosed in the above-cited U.S. Pat. No. 4,243,939. Also, using the gadolinia data, the enrichment data is corrected for gadolinia content fluctuations, either in the form of spikes or more gradual changes, as may occur when the pellets in the column come from different manufacturing batches. But for this correction, gadolinia fluctuations could show up as false and possibly rejectable spikes in the enrichment data. In subroutine POINT, the gadolinia and enrichment data are analyzed to accurately determine the beginning and ends of the pellet column, and, by linear interpolation, the gadolinia data points are adjusted in number, if necessary, and then precisely matched up with the enrichment data points. A trace of the gadolinia data is then printed out by plotter-printer 46. The gadolinia rod enrichment data is then processed by routines SMOOTH, BOIL, and ZONEL in the same manner as the urania rod enrichment data described above.

Figure 3:
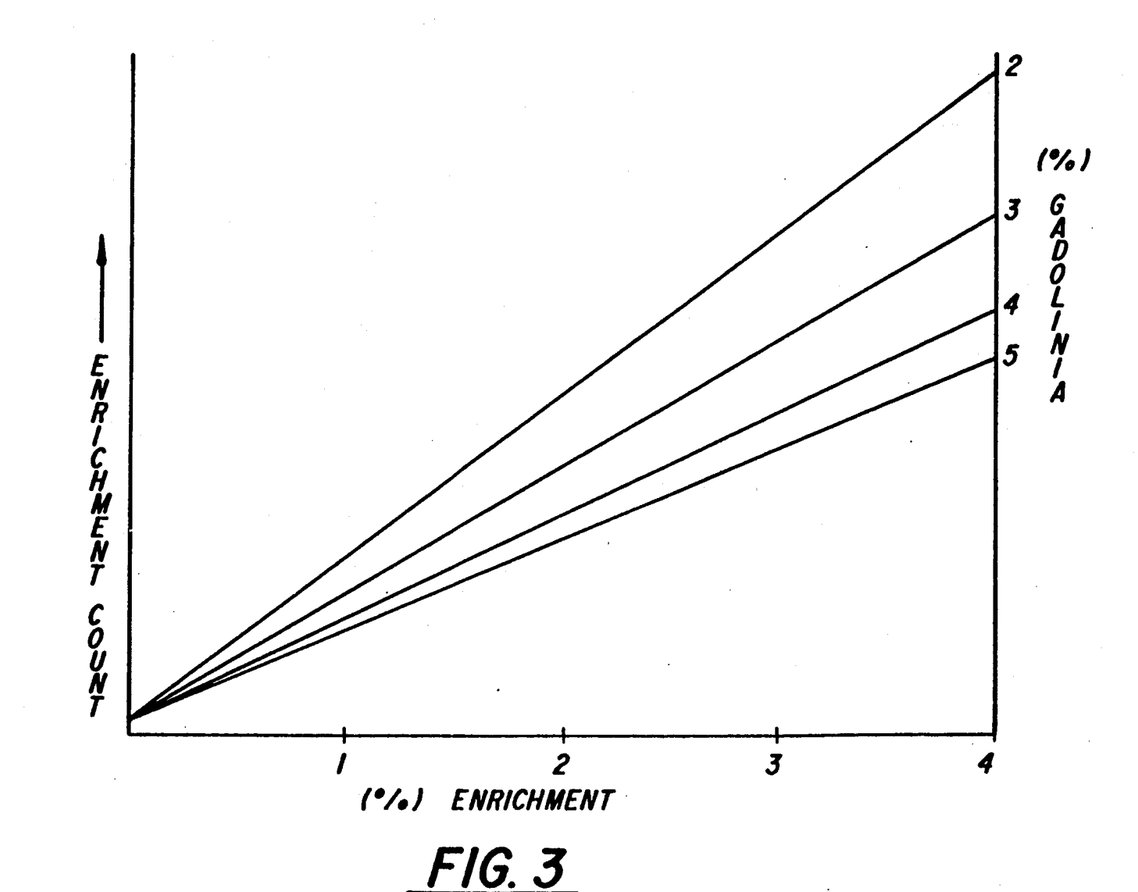
FIG. 3 is a graph illustrating the relationship of gamma ray count as a function of enrichment concentrations for nuclear fuel containing four different concentrations of gadolinia.

The gadolinia and enrichment data are then combined in routine EPROC and its subroutines CTOEU, ENTOC and SPKCK. For those pellet zones of a gadolinia rod which do not contain gadolinia, enrichment data is processed in the above-described manner for urania rods to determine weight percent U-235, zone average enrichment, grams weight U-235, grams weight uranium, and top three feet enrichment, and is checked for rejectable enrichment spikes and pellet strings. For these pellet zones containing gadolinia, the mathematical relationship between enrichment count data and weight percent enrichment changes since the presence of the neutron-absorbing gadolinia severely reduces, as a function of its concentration, the number of fissions induced during active scanning. FIG. 3 is a graphical relationship of weight percent enrichment versus enrichment count data as function of four different concentrations of gadolinia, i.e., 2.0, 3.0, 4.0 and 5.0 weight percent gadolinia, which were derived mathematically and verified empirically utilizing the passive scanning method disclosed in the above-cited U.S. Pat No. 4,229,654. Thus, routine CTOEU, processes the weight percent gadolinia data and enrichment count data to determine weight percent enrichment on a data point by data point basis. Since gadolinia content typically does not fall precisely on any of the four gadolinia lines indicated in FIG. 3, subroutine CTOEU interpolates between the slopes of the design weight percent gadolinia lines and the next values above and below the closest design slope to determine the proper slope to use at each data point in calculating weight percent enrichment from enrichment count data. Routine EPROC then computes the zone average enrichment and the grams U-235 and grams uranium in each zone. Subroutine SPKCK checks the enrichment count data for rejectable spikes and pellet strings, and an enrichment trace is printed out by printer-plotter 46 in positionally aligned relation with the density and gadolinia content traces. The main program then checks the average enrichment data and gadolinia concentration data against the appropriate rod map to determine if the tested gadolinia rod has been fabricated in accordance with applicable engineering specifications (rod map). Based on this determination and the others noted above, the appropriate accept-reject decision is rendered to sorter 50.

While the system seen in FIG. 1 shows one gadolinia rod test channel and one urania rod test channel, in practice the system may include a greater number of test channels angularly located about the cask centerline 28a. Since a typical fuel assembly consists of a greater number of urania rods than gadolinia rods, the system may, for example, be implemented with five urania rod test channels and one gadolinia rod test channel, all advantageously sharing a common densitometer source 34 and a common active scanning neutron source 40.

It is thus seen that the objects set forth above, including those made apparent from the foregoing description, are efficiently attained, and since certain changes may be made in the disclosed non-destructive testing system and method without departing from the present invention, it is intended that all matters contained herein be taken as illustrative and not in a limiting sense.

Having described the invention, what is claimed as new and desired to secure by Letters Patent is:

1. A system for non-destructively testing both poisoned and non-poisoned nuclear fuel rods, said system including, in combination:
   A. first means for serially conveying poisoned fuel rods along a first test channel;
   B. second means for serially conveying non-poisoned fuel rods along a second test channel;
   C. a magnetometer stationed along said first test channel through which the poisoned fuel rods are successively conveyed, said magnetometer generating poison data indicative of the poison concentration at each of a multiplicity of data points distributed along the fuel rod length;
   D. a first background detector stationed along said first test channel for generating first background count data indicative of the gamma rays naturally emitted from each of a multiplicity of data points distributed along the fuel rod length during conveyance of each poisoned fuel rod therepast;
   E. a second background detector stationed along said second test channel for generating second background count data indicative of the gamma rays naturally emitted from each of a multiplicity of data points distributed along the fuel rod length during conveyance of each non-poisoned fuel rod therepast;
   F. a densitometer including
      1) a gamma ray source positioned to direct a first gamma ray beam at each poisoned fuel rod moving along said first test channel and to direct a second gamma ray beam at each non-poisoned fuel rod moving along said second test channel;
      2) a first density detector positioned to measure the degree of attenuation of said first beam by each poisoned rod and generate corresponding first density count data indicative of fuel density at each of a multiplicity of data points distributed along the length of each poisoned fuel rod moving along said first test channel. and
      3) a second density detector positioned to measure the degree of attenuation of said second beam by each non-poisoned fuel rod and generate corresponding second density count data indicative of fuel density at each of a multiplicity of data points distributed along the length of each non-poisoned fuel rod moving along said second test channel;
   G. an active scanner through which said first and second test channels extend, said active scanner including
      1) a neutron source positioned to provide neutron flux irradiation of each poisoned fuel rod moving along said first test channel and neutron flux irradiation of each non-poisoned fuel rod moving along said second test channel,
      2) at least one first enrichment detector stationed along said first test channel beyond said neutron source and responsive to neutron-induced gamma ray emissions from a multiplicity of data points distributed along the length of each poisoned rod for generating corresponding first enrichment count data during poisoned rod movement therepast, and
      3) at least one second enrichment detector stationed along said second test channel beyond said neutron source and responsive to neutron-induced gamma ray emissions from a multiplicity of data points distributed along the length of each non-poisoned rod for generating corresponding second enrichment count data during non-poisoned rod movement therepast; and
   H. a computer responsive to said poison concentration data, said first background count data, said first density count data and said first enrichment count data for determining the enrichment concentration at each data point along the length of each poisoned fuel rod and separately responsive to said second background count data, said second density data and said second enrichment count data for determining the enrichment concentration at each data point along the length of each non-poisoned fuel rod.

2. The system defined in claim 1, which further includes an irradiator cask containing said active scanner.

3. The system defined in claim 2, wherein said neutron source is located on the centerline of said cask, and said first and second test channels extend through said cask in parallel, spaced relation to said cask centerline.

4. The system defined in claim 3, wherein said gamma ray source is located on said cask centerline.

5. The system defined in claim 3, wherein each poisoned and non-poisoned fuel rod bears a serial number uniquely identifying each fuel rod and the engineering specifications to which it was fabricated, said system further including means for reading said serial number from each fuel rod and successively entering said serial numbers into said computer.

6. The system defined in claim 4, wherein said computer stores the engineering specifications for each fuel rod, checks at least said poison data and said first enrichment count data against the applicable engineering specifications to render a first determination whether each poisoned fuel rod is acceptable or rejectable, and checks at least said second enrichment count data against the applicable engineering specifications to render a second determination whether each non-poisoned fuel rod is acceptable or rejectable.

7. The system defined in claim 6, which further includes means at the output ends of said first and second test channels responsive to said first and second determinations by said computer for sorting the poisoned and non-poisoned fuel rods into accepted and rejected groups.

8. The system defined in claim 6, which further includes a printer-plotter connected with said computer for printing out separate traces of enrichment concentration and poison concentration versus distance along each poisoned fuel rod and for printing out a trace of enrichment concentration versus distance along each non-poisoned fuel rod.

* * * * *